United States Patent [19]

Schaible

[11] Patent Number: 4,871,187
[45] Date of Patent: Oct. 3, 1989

[54] WHEEL SUSPENSION FOR A MOTOR VEHICLE

[75] Inventor: Walter Schaible, Hemmingen, Fed. Rep. of Germany

[73] Assignee: Dr. Ing. H.c.F. Porsche Aktiengesellschaft, Weissach, Fed. Rep. of Germany

[21] Appl. No.: 245,640

[22] Filed: Sep. 19, 1988

[30] Foreign Application Priority Data

Oct. 21, 1987 [DE] Fed. Rep. of Germany ....... 3735544

[51] Int. Cl.$^4$ .......................... B60G 3/20; B60G 15/00
[52] U.S. Cl. .................................... 280/667; 280/670; 280/696; 280/701
[58] Field of Search ............... 280/666, 667, 668, 670, 280/696, 701, 724, 725

[56] References Cited

U.S. PATENT DOCUMENTS

| 2,756,067 | 7/1956 | Porsche et al. | 280/666 |
| 2,907,578 | 10/1959 | Taber | 280/667 |
| 4,341,396 | 7/1982 | Decouzon et al. | 280/666 |
| 4,753,455 | 6/1988 | Murakami et al. | 280/696 |

FOREIGN PATENT DOCUMENTS

| 279135 | 8/1988 | European Pat. Off. | 280/667 |
| 1533988 | 7/1968 | France | 280/667 |

*Primary Examiner*—Kenneth R. Rice
*Attorney, Agent, or Firm*—Barnes & Thornburg

[57] ABSTRACT

A wheel suspension for a motor vehicle, especially a double wishbone-type axle with a shock absorber-, respectively, spring-leg, which is supported on the body side and connected with a guide member. An intermediate member is arranged between the wheel carrier and an upper cross guide member and is connected with the shock absorber leg. The intermediate member includes two arms, whereby one arm is rotatably connected with the wheel carrier by way of a joint and the upper cross guide member is pivotally retained in the other arm. The intermediate member includes for the secure connection with the shock absorber leg a mounting sleeve in which an area of the cylinder of the shock absorber leg is retained. The shock absorber leg can be arranged adjustable in height by way of a special retaining arrangement.

15 Claims, 1 Drawing Sheet

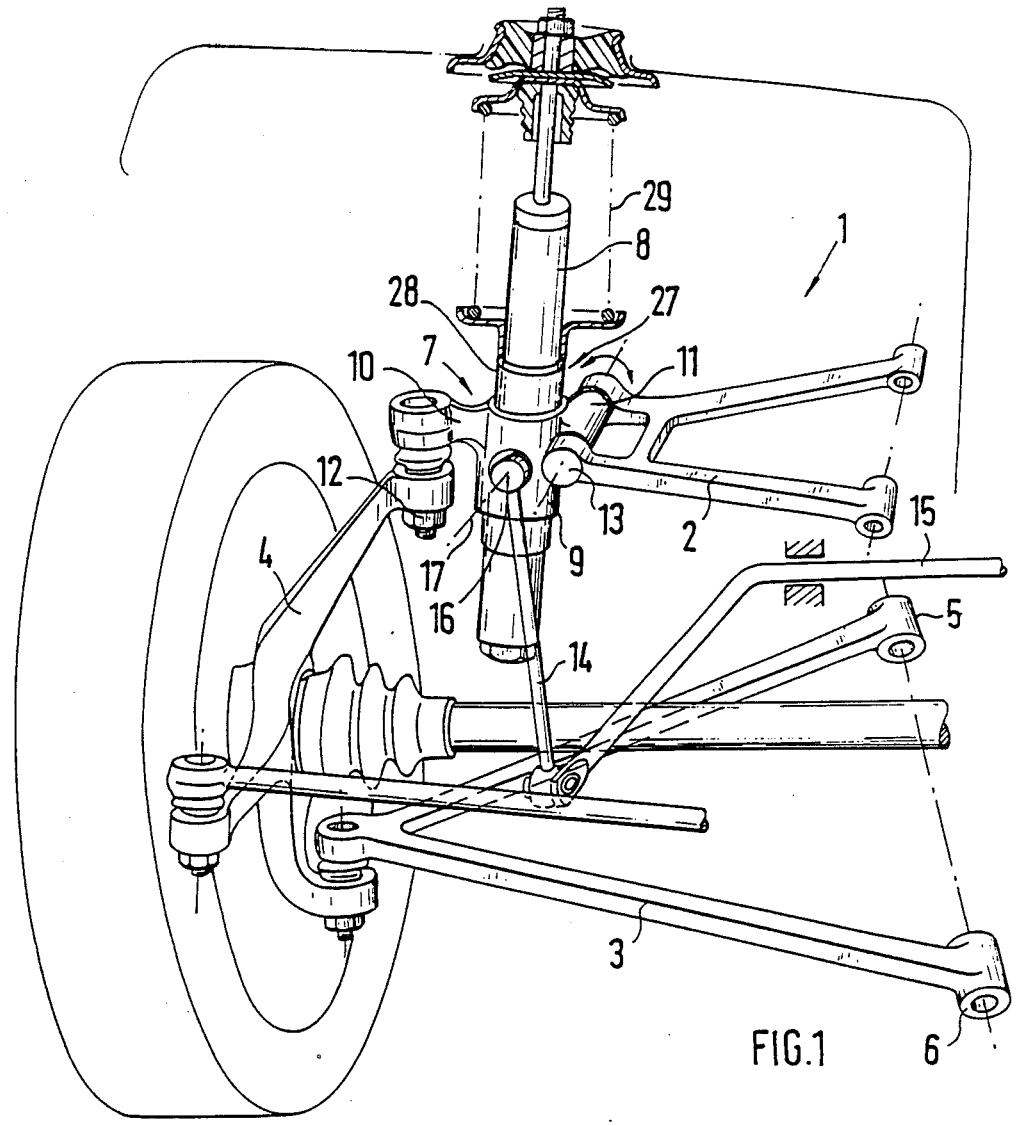
FIG.1
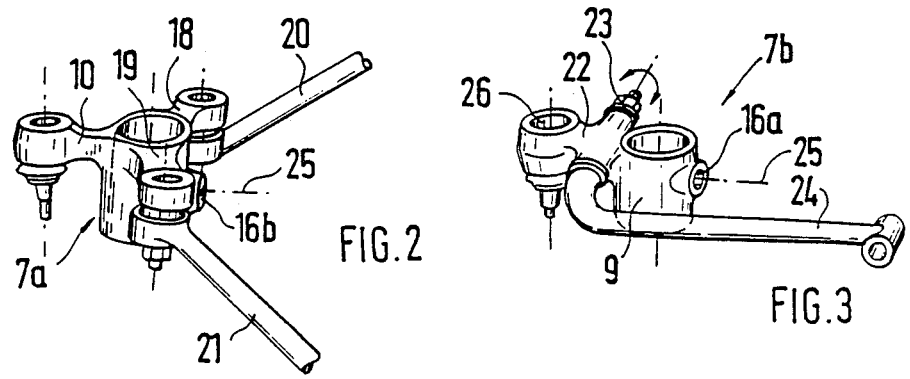
FIG.2
FIG.3

WHEEL SUSPENSION FOR A MOTOR VEHICLE

BACKGROUND AND SUMMARY OF THE INVENTION

The present invention relates to a wheel suspension for a motor vehicle, especially to a double wishbone axle, with a shock absorber-, respectively, spring-leg that is supported on the body side and connected with a guide member.

A wheel suspension of double wishbone-type construction is disclosed in the DE-OS No. 32 19 685 which includes a shock absorber-, respectively, spring-leg that is supported on the body side and is connected with the lower cross guide member. With such a prior art construction, one encounters certain structural expenditures at the spring leg, for example, for driven axles, to extend the drive shaft without impairment to the wheel. This is achieved in this prior art construction by a fork-shaped lower spring leg end, between which the drive shaft is extended freely rotatably.

It is the object of the present invention to provide a wheel suspension with an arrangement of a shock absorber- or spring-leg having an optimized response behavior whereby also a use of a shock absorber leg becomes possible for driven axles without additional structural expenditure.

Owing to the connection of the shock absorber leg with an intermediate member which is connected, on the one hand, with the upper cross guide member and, on the other with the wheel carrier by way of the guide joint, it is achieved in an advantageous manner that the shock absorber leg can be designed of relatively great length with a corresponding shock-absorbing travel. Furthermore, a sufficient free space underneath the spring leg end is present in driven axles for the free unimpaired extension of a drive shaft so that a complicated constructive solution as, for example, by means of a fork-shaped spring leg end, can be dispensed with. Furthermore, a direct translation from the wheel to the shock absorber-, respectively, spring-leg of 1:1 and a wheel/stabilization translation of 1:1 is additionally achieved by the arrangement of the shock absorber-, respectively, spring-leg in the intermediate member as well as by the bearing support of the stabilizer suspension at the intermediate member.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a perspective view of a wheel suspension of double wishbone-type construction with an intermediate member in accordance with the present invention;

FIG. 2 is a partial perspective view of a modified embodiment of an intermediate member with a split-up guide member in accordance with the present invention; and FIG. 3 is a partial perspective view of a further embodiment of an intermediate member with a single guide arm in accordance with the present invention.

DETAILED DESCRIPTION OF THE DRAWINGS

Referring now to the drawing wherein like reference numerals are used throughout the various views to designate like parts, the wheel suspension 1 according to FIG. 1 essentially includes an upper cross-guide member 2 and a lower cross guide member 3 which is pivotally connected with a wheel carrier 4 and is pivotally supported at the vehicle body or frame in bearings 5 and 6. An intermediate member 7 is arranged between the wheel carrier 4 and the upper cross guide member 2 in which a spring-, respectively, shock absorber-leg is retained. The intermediate member 7 includes a mounting sleeve 9 which has protruding arms 10 and 11 whereby the one arm 10 is directed toward the wheel carrier 4 and receives a guide joint 12 while the further arm 11 carries a bearing support 13 of the guide member 2.

Preferably the lower end of the shock absorber leg 8 is retained by the mounting sleeve 9, respectively, it is connected with the sleeve by appropriate connecting materials whereby it is quite possible that also another area of the shock absorber leg can be retainingly surrounded.

As shown in FIG. 1, the intermediate member 7 includes a joint 16 for an attachment 14 of a stabilizer 15. The joint 16 is provided between the two arms 10 and 11 within the area of the mounting sleeve 7, whereby at least one pivot axis 17 of the attachment 14 extends in the longitudinal direction of the vehicle.

According to a further embodiment as shown in FIG. 2, the intermediate member 7a includes a first arm 10 according to the embodiment of FIG. 1 as well as two further arms 18 and 19 which are arranged diverging with respect to one another and receive the split-up cross guide member 20, 21. A joint 16b for the attachment 14 of the stabilizer is provided between these two arms 18 and 19 having at least one transversely extending pivot axis 25.

An intermediate member 7b is illustrated in FIG. 3 which includes a single arm 22 between the mounting device 9 and the wheel carrier 4 that includes both the bearing support 26 for the guide joint 12 as also a bearing support 23 for an arm of a cross guide member 24. In the two embodiments according to FIGS. 2 and 3, the joints 16a and 16b for the attachment 14 are shown with at least one axis 25 extending transversely to the vehicle, whereby corresponding to the spatial arrangement of the stabilizer, these joints 16a and 16b may also have a position according to FIG. 1. The joints 16, 16a, and 16b may be arranged at any desired location along the circumference of the mounting sleeve 9 corresponding to the particular construction.

The shock absorber-, respectively, spring-leg 8 may be secured adjustably in height in the mounting sleeve 9 of the intermediate members 7, 7a and 7b by way of retaining means 27 such as threads 28, clamping parts and similar fastening elements so that the leg 8 can be adjusted in height corresponding to the design of the spring 29.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wheel suspension for a motor vehicle, comprising a shock absorber means supported at a relatively fixed part of the vehicle, an upper cross guide member, and an intermediate member arranged between a wheel carrier means and the upper cross guide member, said intermediate member being connected to an intermediate part of the shock absorber means.

2. A wheel suspension according to claim 1, wherein the wheel suspension is a double wishbone-type axle.

3. A wheel suspension according to claim 1, wherein the intermediate member includes two arms, one arm being rotatably connected with the wheel carrier means by way of a guide joint and the upper closed cross guide member being pivotally retained in the other arm.

4. A wheel suspension according to claim 1, wherein the intermediate member includes a mounting sleeve means for the secure connection with the leg means, in which an area of the cylinder of the leg means is retained.

5. A wheel suspension according to claim 4, wherein a joint means for an attachment of a stabilizer is arranged in the mounting sleeve means of the intermediate member, which has at least one pivot axis extending in the vehicle longitudinal direction.

6. A wheel suspension according to claim 4, wherein the intermediate member includes a single arm arranged between the wheel carrier means and the mounting sleeve means which includes a bearing support means for the guide joint and adjacent thereto a bearing support means for a guide arm.

7. A wheel suspension according to claim 6, wherein a joint means having at least a transversely extending pivot axis for a stabilizer attachment is arranged in the mounting sleeve means of the intermediate member.

8. A wheel suspension according to claim 4, wherein the intermediate member includes at least two diverging arms for the pivotal support of a split-up cross guide member and an attachment joint means is provided between said two arms.

9. A wheel suspension according to claim 4, wherein the leg means is positionally adjustably retained in the mounting sleeve means as regards height by way of retaining means.

10. A wheel suspension according to claim 9, wherein the retaining means consists of a threaded engagement between the cylinder of the leg means and of the sleeve means.

11. A wheel suspension according to claim 5, wherein the intermediate member includes two arms, one arm being rotatably connected with the wheel carrier means by way of a guide joint and the upper closed cross guide member being pivotally retained in the other arm.

12. A wheel suspension according to claim 1, wherein the leg means is positionally adjustably retained in a mounting sleeve means of the intermediate member as regards height by way of retaining means.

13. A wheel suspension according to claim 12, wherein the retaining means consists of a threaded engagement between the cylinder of the leg means and of the sleeve means.

14. A wheel suspension according to claim 1, wherein the intermediate member includes at least two diverging arms for the pivotal support of a split-up cross guide member and an attachment joint means is provided between said two arms.

15. A wheel suspension according to claim 1, wherein the intermediate member includes a single arm arranged between the wheel carrier means and a mounting sleeve means which includes a bearing support means for the guide joint and adjacent thereto a bearing support means for a guide arm.

* * * * *